United States Patent [19]

Weitz et al.

[11] 3,852,356

[45] Dec. 3, 1974

[54] PRODUCTION OF ALIPHATIC AND CYCLOALIPHATIC ALPHA-NITROKETONES

[75] Inventors: Hans Martin Weitz; Hans-Henning Vogel, both of Frankenthal; Kurt Kahr, Neustadt; Hugo Fuchs, Ludwigshafen, all of Germany

[73] Assignee: Badische Anilin & Soda-Fabrik Aktiengesellschaft, Ludwigshafen, Germany

[22] Filed: Oct. 6, 1972

[21] Appl. No.: 295,442

[30] Foreign Application Priority Data

Oct. 6, 1971  Germany............... 2149821

[52] U.S. Cl.... 260/586 R, 260/239.3 A, 260/526 S, 260/534 R, 260/537 R, 260/538, 260/586 M
[51] Int. Cl... C07c 45/00, C07c 49/06, C07c 49/30
[58] Field of Search......... 260/586 R, 586 A, 593 R

[56] References Cited
UNITED STATES PATENTS

| | | | |
|---|---|---|---|
| 2,982,772 | 5/1961 | Godt | 260/586 R |
| 3,466,326 | 9/1969 | Lachowicz et al. | 260/586 R X |
| 3,574,756 | 4/1971 | Sheehan | 260/586 R |

*Primary Examiner*—Howard T. Mars
*Assistant Examiner*—Norman Morgenstern
*Attorney, Agent, or Firm*—Johnston, Keil Thompson & Shurtleff

[57] ABSTRACT

Production of aliphatic and cycloaliphatic $\alpha$-nitroketones in liquid phase by reaction of the corresponding ketones with concentrated nitric acid whose water content is less than 5.0 percent by weight. In principle all aliphatic and cycloaliphatic ketones can be nitrated according to the invention. Examples are diethyl ketone, cyclohexanone and cyclododecanone.

16 Claims, 1 Drawing Figure

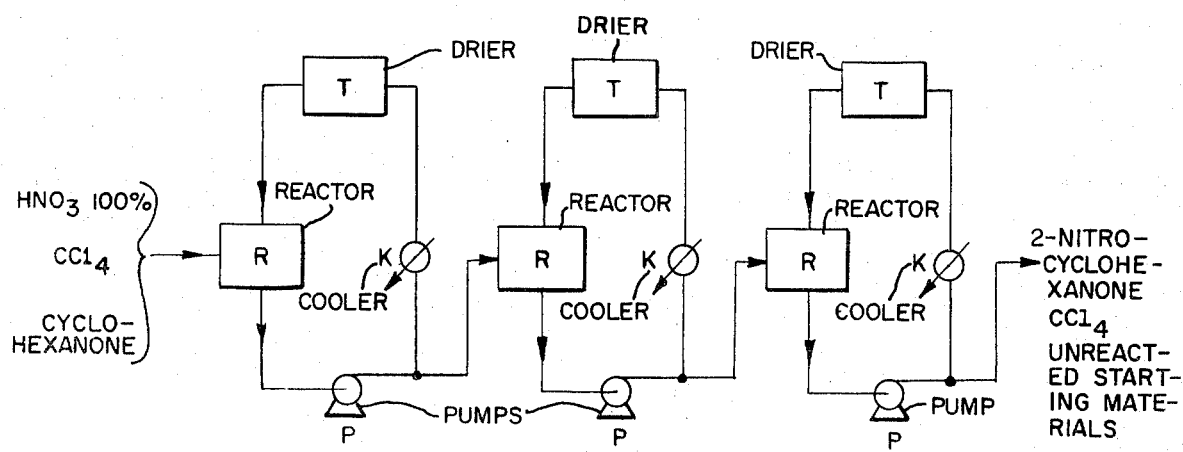

PRODUCTION OF ALIPHATIC AND CYCLOALIPHATIC ALPHA-NITROKETONES

This invention relates to a process for the production of aliphatic and cycloaliphatic α-nitroketones from the appropriate ketones by reaction with nitric acid. More particularly, the invention relates to a process for the production of α-nitrocyclohexanone from cyclohexanone by reaction with nitric acid.

α-nitroketones are valuable starting materials for the production of a large number of chemical products. Particularly α-nitrocyclohexanone has recently acquired significance as a precursor for the production of caprolactam. By ring cleavage in alkaline or bicarbonate-alkaline solution α-nitrocyclohexanone gives ε-nitrocaproic acid which can be converted by catalytic hydrogenation into ε-aminocaproic acid. Catalytic hydrogenation of α-nitrocyclohexanone in ammoniacal medium gives α-aminocaproic acid in a single step. α-aminocaproic acid is known to be easily cyclized into caprolactam by thermal treatment.

Methods for the production of aliphatic and cycloaliphatic α-nitroketones are already known from the literature. The oldest method is the reaction of α-haloketones with salts of nitrous acid (A. Lucas, Ber., 32, 600 (1899)). α-nitroketones are also obtained in the reaction of ketones with alkyl nitrates in an alkaline medium. Another route starts from the addition of $N_2O_4$ to olefins, the α-nitroalcohols first formed being converted by oxidation into the corresponding nitroketones. Another proposal describes the production of α-nitroketones from the corresponding enol esters which are converted by means of acetyl nitrate or nitric acid into acetic anhydride. All these prior art methods for the production of aliphatic and cycloaliphatic nitroketones have the great disadvantage that valuable starting materials or auxiliaries are used and that in many methods stoichiometric amounts of byproducts are necessarily obtained.

We have now found that surprisingly α-nitroketones are obtained by a simple method and in good yields by reacting an appropriate ketone in the liquid phase with concentrated nitric acid having a water content of less than 5.0 percent by weight in the presence of an inert solvent.

The reaction of nitric acid with ketones and particularly with cyclohexanone alone has been investigated very thoroughly. Nitrocyclohexanone has however never been isolated as reaction product in any of these experiments. The reaction of nitric acid with cyclohexanone is known to be used in the commerical production of adipic acid. The process is carried out in the presence of oxidation catalysts, small amounts of nitrous acid and at a temperature above 50°C. If the reaction temperature is lowered to below 35°C and no catalytically active substance is added, the reaction of nitric acid with cyclohexanone gives the corresponding ω-carboxynitrolic acid, whereas reaction at 10° to 20°C gives the polycyclic bridge acetal octahydro-5aH,10aH,4a,9a-epoxydibenzo-p-dioxyn-5a,10-diol $C_{12}H_{18}O_5$ — hemihydrate of 1,2-cyclohexadione — which decomposes slowly into glutaric acid, succinic acid and oxalic acid (W. J. von Asselt and D. W. von Kreveln R 82 (1963) 51 and H. C. Godt, U.S. Pat. No. 2,982,772 (1961)).

In principle all aliphatic and cycloaliphatic ketones are suitable for the reaction with nitric acid according to the invention; examples are acetone, butanone-2, pentanone-3, methyl isobutyl ketone, and cycloaliphatic ketones such as cyclopentanone, cyclohexanone, cycloheptanone, cyclooctanone, cyclodecanone and cyclododecanone.

The reaction of the ketones with anhydrous nitric acid is carried out in inert solvents. Lower halogenated aliphatic hydrocarbons, particularly $CCl_4$, $CCl_3F$ and $CCl_3Br$ have proved to be particularly suitable. It is possible however to carry out the reaction in the presence of other solvents which are inert under the reaction conditions and which if desired may be polar solvents, as for example nitroalkanes and nitrocycloalkanes such as nitromethane and nitrocyclohexane, nitroaromatics such as nitrobenzene, halogenated aromatics such as chlorobenzene, o-dichlorobenzene, linear or cyclic sulfones, as for example dimethylsulfone and diethylsulfone, substituted tetrahydrothiophene-1,1-dioxide and other solvents which are stable to $HNO_3$ as for example dimethoxyethane and other cyclic ethers such as dioxane or tetrahydrofuran, aliphatic and cycloaliphatic hydrocarbons such as pentane, hexane or cyclohexane, and a mixture of these solvents with the halogenated hydrocarbons. Adding lower hydrocarbons such as pentane and hexane may facilitate the isolation of the resultant α-nitroketones from the reaction mixture.

Although the ratio of halogenated hydrocarbon to ketone is not fixed in any way, generally a ratio by weight of halogenated hydrocarbon to ketone of from 100:1 to 1:10 is used. The ratio of the solvent which is inert under the reaction conditions to the halogenated hydrocarbon may be from 10:1 to 1:10, but other ratios are not excluded.

The water content of the nitric acid used should be less than 5 percent by weight, preferably less than 2 percent by weight, particularly less than 0.5 percent by weight. In order to achieve complete reaction it may be advantageous to remove the water formed in the reaction from the reaction mixture continuously by means of a suitable drying agent as for example sodidum sulfate, calcium sulfate, sodium nitrate, calcium nitrate, magnesium nitrate, magnesium perchlorate, sodium pyrophosphate and phosphorus pentoxide. It is also possible to use acid-resistant inorganic or organic, solid or liquid ion exchangers or molecular sieves such as zeolites (analcite, chabazite, faujasite, harmotome, heulandite, mordenite, natrolite, phillipsite, thomsonite and others), montmorillonite (bentonite and others), glauconite, ion exchangers based on carbon or polystyrene, carbon molecular sieves having partly hydrophilic properties, silica gel and activated bleaching clays, aluminum hydrosilicates, fuller's earths, or other drying agents acting by adsorption. The fact that a mineral drying agent may change or lose its crystal structure by the action of the acid present has no effect on the removal of water. For example it is not necessary to use particularly hygroscopic substances in an absolutely anhydrous form, because even with a certain water content these substances still have adequate water-absorbent properties in the reaction described. Thus it is possible for example to carry out successfully the nitration of the ketone in the presence of $Mg(NO_3)_2$ which contains from about 2 to 4 molecules of water of crystallization per molecule. Another possibility for the removal of water formed in the reaction consists for example in separating the water by distillation, particularly by azeotropic distillation by means of a suitable entrainer which is stable to nitric acid, at subatmospheric pressure. Another possibility consists in using only a small amount of nitric acid at first and after the reaction has commenced chemically converting the water formed in the nitration into highly concentrated nitric acid by adding $N_2O_5$ or $N_2O_4 + O_2$.

When a water-binding hygroscopic solvent as for example dimethylsulfone, tetrahydrothiophene-1,1-dioxide or dimethoxyethane is used, the water-binding effect of the solvent can be utilized so that the reaction can be carried out with the addition of less of the abovementioned water-binding substances or none at all.

The relative molar ratio of nitric acid to ketone should generally be about 1:1. In some cases it is favorable for the acceleration of the reaction to use a stoichiometric excess of nitric acid of for example 25 percent by weight or particularly of 50 percent by weight.

The reaction temperature should not exceed 90°C; it is advantageously below 50°C. In the case of ketones having little reactivity, particularly of cyclic ketones having little reactivity, reaction temperatures of up to 70°C may be necessary. Any conventional continuous or batchwise method may be used for carrying out the reaction, the only important things being that the water formed in the use of the nitric acid should be removed continuously or intermittently from the mixture, the reactants should be mixed well, the heat of reaction should be removable without difficulty and the temperature of the reaction mixture should remain in the desired range. The sequence in which the participating substances are added does not play any part in the batchwise method. Apparatus suitable for a continuous method may consist for example of one endless tube system or several successive tube systems provided with suitable means for mixing, conveying the product stream, removing the heat of reaction and removing water from the reaction mixture. A plurality of dryers operating on the regenerative principle may be present for each system for the removal of water.

An example of such an apparatus is illustrated diagrammatically in the drawing in which in each case R is a reactor, P a pump, K a cooler and T a dryer. The reaction mixture obtained in the continuous method is processed in a suitable way, for example by adding water. Unreacted reactants and the solvent used may be reused for the reaction if necessary after any separation, purification and/or drying processes required. For example when $CCl_3F$ (boiling point +24°C) is used as solvent, the reaction heat can be removed by evaporative cooling. In batch procedures processing can be carried out in a simple manner after the reaction is over by pouring the reaction mixture into water, separating it and distilling the organic phase. It has proved to be advantageous also in the continuous method (after the reaction is over and the water-absorbing compound has been separated) to add a certain amount of water, for example from 0.1 to 100 percent by weight, preferably from 0.5 to 50 percent by weight, particularly from 1 to 25 percent by weight based on the whole mixture, and then to separate the organic phase. Nitric acid not completely reacted may be converted again into 100 percent nitric acid by a suitable distillation method (for example extractive distillation) and/or by the addition of oxides of nitrogen and oxygen or air.

The drying agent, after adherent solution has been removed by washing with the pure solvent, may be dried in a suitable way, for example by heating, and returned to the process. The nitroketone formed in the reaction may be recovered from the resultant solution for example by distillation, but extractive processing of the reaction mixture is also possible. It may also be convenient to combine together distillative and extractive processing of the reaction mixture. Other methods of processing the reaction mixture may also be used, for example adsorption or the use of solid or liquid ion exchangers, molecular sieves and the like. All these may be combined together in a suitable manner and sequence.

The following Examples illustrate the invention.

EXAMPLE 1

A mixture of 500 parts by weight of $CCl_4$, 50 parts by weight of anhydrous sodium nitrate and 20 parts by weight of nitric acid (water content less than 1 percent by weight) is placed in a round flask fitted with an efficient stirring means. This mixture is brought to a temperature of from 20° to 25°C and then 25 parts by weight of cyclohexanone is rapidly added. The rate of addition of the cyclohexanone is regulated so that the temperature of the reaction mixture (with simultaneous external cooling of the flask with water) does not rise above 25°C. After all the cyclohexanone has been added the mixture is stirred for about another thirty minutes at 25°C. After the reaction mixture has been worked up and the unreacted reactants have been separated, a 2-nitrocyclohexanone is obtained which without any purification contains less than 2 percent by weight of impurities; the content of adipic acid is less than 0.1 percent by weight.

EXAMPLE 2

The procedure described in Example 1 is followed but cyclododecanone is used instead of cyclohexanone as the ketone and nitration is carried out at from 35° to 50°C. The product is worked up and a 2-nitrocyclododecanone is obtained from which there is obtained by distillation a product which according to gas chromatographic analysis has a purity of more than 98 percent. The yield is more than 95 percent.

EXAMPLE 3

The procedure described in Example 1 is followed but diethyl ketone is used instead of cyclohexanone as the ketone, $CCl_3F$ is used as solvent and nitration is carried out at a temperature of from 10° to 15°C. The reaction mixture is processed by distillation and fractionation. 2-nitropentanone-3 is obtained in a purity according to gas chromatographic analysis of more than 95 percent.

EXAMPLE 4

A reaction apparatus as illustrated in the drawing is used for a continuous process. A mixture of 400 parts by weight of carbon tetrachloride, 25 parts by weight of cyclohexanone and 30 parts by weight of anhydrous nitric acid (water content less than 0.5 percent) is added per hour. The dryers are filled with activated bleaching clay (aluminum hydrosilicate) which has previously been treated with nitric acid, pressed into strings and dried. The temperature is kept at 25°C in the reactors and the residence time of the reaction mixture in the apparatus is 30 minutes. The reaction mixture obtained is worked up by adding water and separating the 2-nitrocyclohexanone from the solvent. The nitrocyclohexanone obtained has a purity of 98 percent and contains 0.5 percent of 2-chlorocyclohexanone and less than 0.2 percent of adipic acid. Unreacted starting materials in the solvent are used again for the reaction after they have been dried.

We claim:

1. A process for the production of an aliphatic or cycloaliphatic α-nitroketone which comprises: reacting a ketone selected from the group consisting of acetone, butanone-2, pentanone-3, methyl isobutyl ketone, cyclopentanone, cyclohexanone, cycloheptanone, cyclooctanone, cyclodecanone and cyclododecanone with concentrated nitric acid having a water content of less than 5.0 percent by weight in the presence of an inert solvent selected from the group consisting of halogenated hydrocarbons, nitroalkanes, nitrocycloalkanes, nitroaromatic hydrocarbons, aliphatic hydrocarbons, cycloaliphatic hydrocarbons, linear and cyclic sulfones, cyclic ethers, tetrahydrothiophene-1,1-dioxide, dimethoxy ethane and mixtures thereof with halogenated hydrocarbons, and at a reaction temperature of less than 90° C.

2. A process for the production of an aliphatic or cycloaliphatic α-nitroketone which comprises: reacting a ketone selected from the group consisting of acetone, butanone-2, pentanone-3, methyl isobutyl ketone, cyclopentanone, cyclohexanone, cycloheptanone, cyclooctanone, cyclodecanone and cyclododecanone with concentrated nitric acid having a water content of less than 5.0 percent by weight in the presence of an inert solvent selected from the group consisting of halogenated hydrocarbons, nitroalkanes, nitrocycloalkanes, nitroaromatic hydrocarbons, aliphatic hydrocarbons, cycloaliphatic hydrocarbons, linear and cyclic sulfones, cyclic ethers, tetrahydrothiophene-1,1-dioxide, dimethoxy ethane and mixtures thereof with halogenated hydrocarbons, at a reaction temperature of less than 90° C, and removing the water formed in the reaction from the reaction mixture during the reaction.

3. A process as claimed in claim 2 wherein the temperature in the reaction is below 50°C.

4. A process as claimed in claim 2 wherein a nitric acid is used which has a water content of less than 0.5 percent by weight.

5. A process as claimed in claim 2 wherein a stoichiometric excess of nitric acid over ketone of 1.25:1 is used in the reaction.

6. A process as claimed in claim 2 wherein a stoichiometric excess of nitric acid over ketone of 1.5:1 is used in the reaction.

7. A process as claimed in claim 2 carried out in a halogenated hydrocarbon solvent or a mixture containing the same.

8. A process as claimed in claim 2 carried out in $CCl_4$, $CCl_3F$ or $CCl_3Br$ or a mixture containing the same.

9. A process as claimed in claim 2 carried out in the presence of an inert solvent containing one or more than one nitro group.

10. A process as claimed in claim 2 carried out in the presence of a linear or cyclic sulfone as solvent.

11. A process as claimed in claim 2 wherein the reaction is carried out in the presence of a water-absorbing substance.

12. A process as claimed in claim 2 wherein the reaction is carried out in the presence of a hygroscopic solvent which combines with water.

13. A process as claimed in claim 2 wherein a salt of nitric acid is used as a water-absorbing substance.

14. A process as claimed in claim 2 wherein an inorganic or organic ion exchanger, acid-resistant inorganic or organic molecular sieve, silica gel, activated bleaching clay or other drying agent acting by absorption is used as the water-absorbing substance.

15. A process as set forth in claim 2 wherein said starting material is cyclohexanone.

16. A process for the production of α-nitrocyclohexanone which comprises: continuously reacting cyclohexanone with concentrated nitric acid having a water content of less than 2.0 percent by weight in the presence of an inert solvent selected from the group consisting of halogenated hydrocarbons, nitroalkanes, nitrocycloalkanes, nitroaromatic hydrocarbons, aliphatic hydrocarbons, cycloaliphatic hydrocarbons, linear and cyclic sulfones, cyclic ethers, tetrahydrothiophene-1,1-dioxide, dimethoxy ethane and mixtures thereof with halogenated hydrocarbons, at a temperature of less than 50° C, and continuously removing the water formed in the reaction from the reaction mixture.

* * * * *